(12) United States Patent
Ridray et al.

(10) Patent No.: US 11,187,188 B2
(45) Date of Patent: Nov. 30, 2021

(54) TURBOJET INCLUDING A NACELLE EQUIPPED WITH A THRUST REVERSER SYSTEM INCLUDING A HINGED STRUCTURE

(71) Applicant: Airbus Operations SAS, Toulouse (FR)

(72) Inventors: Frédéric Ridray, L'Isle Jourdain (FR); Lionel Czapla, Cornebarrieu (FR); Frédéric Piard, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 330 days.

(21) Appl. No.: 16/371,430

(22) Filed: Apr. 1, 2019

(65) Prior Publication Data

US 2019/0309704 A1    Oct. 10, 2019

(30) Foreign Application Priority Data

Apr. 5, 2018 (FR) .................................. 1852968

(51) Int. Cl.
| | |
|---|---|
| *F02K 1/70* | (2006.01) |
| *F02K 1/72* | (2006.01) |
| *B64D 29/06* | (2006.01) |
| *B64D 29/08* | (2006.01) |

(52) U.S. Cl.
CPC ............... *F02K 1/70* (2013.01); *B64D 29/06* (2013.01); *B64D 29/08* (2013.01); *F02K 1/72* (2013.01); *F05D 2230/72* (2013.01)

(58) Field of Classification Search
CPC .. F02K 1/70; F02K 1/72; B64D 29/06; B64D 29/08; F05D 2230/72
See application file for complete search history.

(56) References Cited

U.S. PATENT DOCUMENTS

| | | | |
|---|---|---|---|
| 2006/0145001 A1* | 7/2006 | Smith ................ | B64D 33/04 244/110 B |
| 2010/0024387 A1 | 2/2010 | Marche | |
| 2013/0047580 A1 | 2/2013 | Beardsley | |
| 2013/0220435 A1* | 8/2013 | James ................ | B64D 29/08 137/15.1 |

(Continued)

FOREIGN PATENT DOCUMENTS

| | | |
|---|---|---|
| EP | 2562405 A1 | 2/2013 |
| EP | 3103995 A2 | 12/2016 |

OTHER PUBLICATIONS

French Search Report; priority document.

*Primary Examiner* — Andrew H Nguyen
(74) *Attorney, Agent, or Firm* — Greer, Burns & Crain, Ltd.

(57) ABSTRACT

A ducted fan turbojet including a nacelle including a fixed structure, a thrust reverser system having a frame, a mobile structure fastened to the frame, inner doors and outer doors hinged at the frame. The frame is mobile in translation on the fixed structure between a forward position and a rear position so as to define a window between the fixed structure and the mobile structure, the window being open between a bypass duct and the exterior of the nacelle. Each door is mobile between a stowed position and a deployed position and the mobile structure is assembled hinged on the frame via at least one hinge whose axis of rotation is globally parallel to a longitudinal axis of the ducted fan turbojet.

10 Claims, 4 Drawing Sheets

(56) References Cited

U.S. PATENT DOCUMENTS

| | | | | |
|---|---|---|---|---|
| 2014/0116026 A1* | 5/2014 | Todorovic | ............ | F02K 1/72 |
| | | | | 60/226.2 |
| 2014/0234090 A1* | 8/2014 | Hurlin | ............ | B64D 29/06 |
| | | | | 415/182.1 |
| 2015/0143796 A1* | 5/2015 | Lacko | ............ | F02K 1/64 |
| | | | | 60/226.2 |
| 2015/0275766 A1* | 10/2015 | Kohlenberg | ............ | F02C 7/36 |
| | | | | 60/805 |
| 2016/0169156 A1* | 6/2016 | Stuart | ............ | F02K 1/72 |
| | | | | 239/265.19 |
| 2016/0363097 A1* | 12/2016 | Foutch | ............ | F02K 1/70 |
| 2017/0174353 A1* | 6/2017 | Joret | ............ | B64D 29/06 |

* cited by examiner

TURBOJET INCLUDING A NACELLE EQUIPPED WITH A THRUST REVERSER SYSTEM INCLUDING A HINGED STRUCTURE

CROSS-REFERENCES TO RELATED APPLICATIONS

This application claims the benefit of the French patent application No. 1852968 filed on Apr. 5, 2018, the entire disclosures of which are incorporated herein by way of reference.

FILED OF THE INVENTION

The present invention relates to a ducted fan turbojet that includes a nacelle equipped with a thrust reverser system including doors and a hinged mobile structure, and an aircraft including at least one such ducted fan turbojet.

BACKGROUND OF THE INVENTION

FIG. 7 is a front view of a propulsion system 700 of the prior art for an aircraft. The aircraft includes a fuselage, on either side of which a wing 702 is fastened. The propulsion system 700 comprises a pylon 704, a ducted fan turbojet 706 having a core 708 constituting the engine, and a nacelle 710.

The pylon 704 is fastened under the wing 702 and supports the core 708 and the nacelle 710.

So as to ensure the maintenance of the ducted fan engine 706, the nacelle 710 has structures that are mobile between a closed position in which the structures are tightened around the core 708 and an open position in which the structures are away from around the core 708.

In particular, the nacelle 710 has two internal fixed structures (IFS) 712$a$-$b$ and two outer structures (OS) 714$a$-$b$.

Each structure 712$a$-$b$, 714$a$-$b$ is globally semicylindrical in shape and the nacelle 710 has, on either side of a center plane, substantially vertical and passing through the central axis of the core 708, an internal fixed structure 712$a$-$b$ and an associated outer structure 714$a$-$b$.

In the closed position, the two internal fixed structures 712$a$-$b$ are contiguous and globally form a cylinder that surrounds the core 708 and constitutes the inside wall of the bypass duct and the two outer structures 714$a$-$b$ are contiguous and globally form a cylinder that surrounds the internal fixed structures 712$a$-$b$ and constitutes the outside wall of the bypass duct.

Each outer structure 714$a$-$b$ is assembled hinged on the pylon 704 by means of hinges. Each internal fixed structure 712$a$-$b$ is fastened to the associated outer structure 714$a$-$b$ and fastening is provided by lower structural elements 716$a$-$b$ and upper structural elements 718$a$-$b$. For each outer structure 714$a$-$b$, the associated internal fixed structure 712$a$-$b$ is thus fastened to the outer structure 714$a$-$b$ at the lower part by a lower structural element 716$a$-$b$ and at the upper part by an upper structural element 718$a$-$b$.

Although such an arrangement is of particular value when neither of the structures is mobile when the ducted fan turbojet 706 is operating, this arrangement is not suitable when one of the structures is mobile in operation, in particular when a structure is mobile as part of a thrust reverser system.

SUMMARY OF THE INVENTION

An object of the present invention is to propose a ducted fan turbojet that includes a nacelle equipped with a thrust reverser system with a plurality of doors and a mobile structure that is hinged so as to allow it to open during maintenance operations.

For this purpose, a ducted fan turbojet is proposed, including an engine, a nacelle surrounding the engine and a fan casing, where a bypass duct of a bypass flow is delimited between the nacelle and the engine and in which an air flow circulates along a flow direction, the nacelle including:

a fixed structure fastened to the fan casing, a thrust reverser system having a frame, a mobile structure fastened to the frame, inner doors hinged by a rear edge at the frame and outer doors hinged by a rear edge at the frame, the doors being disposed forward with respect to the mobile structure, the frame being mobile in translation on the fixed structure along a direction of translation between a forward position in which the frame is positioned such that the outer doors are close to the fan casing and a rear position in which the frame is positioned such that the outer doors are away from the fan casing so as to define a window between the fixed structure and the mobile structure, the window being open between the bypass duct and the exterior of the nacelle, each door being mobile between a stowed position in which it obscures the window and a deployed position in which it does not obscure the window, the mobile structure is assembled hinged on the frame by means of at least one hinge whose axis of rotation is globally parallel to a longitudinal axis X of the ducted fan turbojet.

Such a ducted fan turbojet can thus be opened easily for maintenance operations.

Advantageously, the fixed structure includes a 12 o'clock beam, the frame includes a high beam that is positioned against the 12 o'clock beam, and each hinge is fastened between the high beam and a high part of the mobile structure.

Advantageously, the fixed structure includes a 6 o'clock beam, the frame includes a low beam that is positioned against the 6 o'clock beam, and the ducted fan turbojet includes at least one lock that locks a low part of the mobile structure on the low beam.

Advantageously, the low beam has stops, and for each stop, the low part of the mobile structure includes a counter-stop that presses against the stop in the closed position.

Advantageously, the frame has a groove open to the exterior and extending on a circular periphery of the frame that faces a forward edge of the mobile structure, the forward edge has a rib that extends along the forward edge, and, in the closed position, the rib is positioned in the groove.

The invention also proposes an aircraft including at least one ducted fan turbojet according to one of the preceding variants.

BRIEF DESCRIPTION OF THE DRAWINGS

The abovementioned characteristics of the invention, as well as others, will emerge more clearly on reading the following description of an embodiment example, the description being made in relation to the attached drawings, among which.

DETAILED DESCRIPTION OF EMBODIMENTS

In the description that follows, the terms relating to a position are taken with reference to the direction of forward motion of an aircraft.

Figure 1:
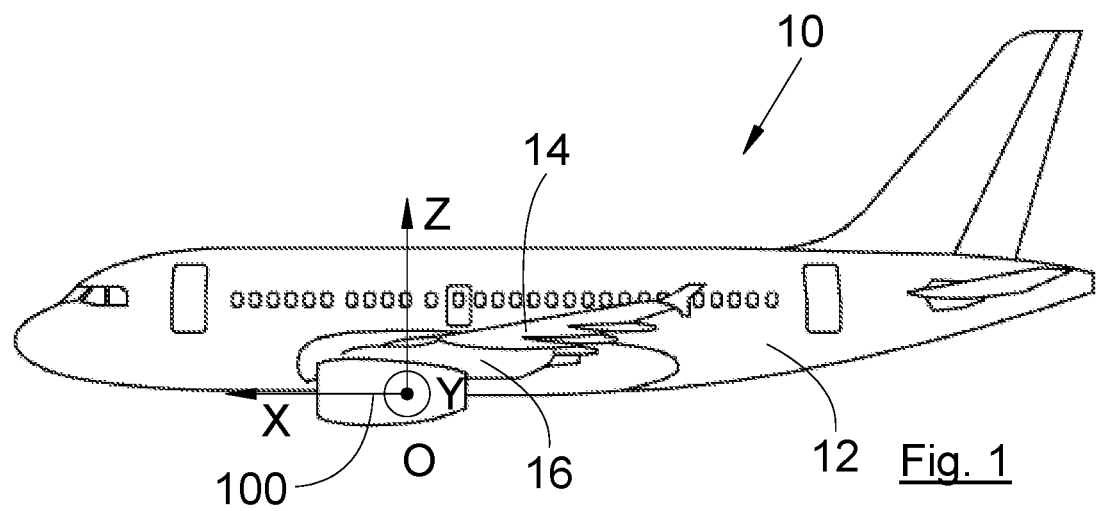
FIG. 1 is a side view of an aircraft including a ducted fan turbojet according to the invention.

FIG. 1 shows an aircraft 10 that includes a fuselage 12 on either side of which a wing 14 is fastened, which supports at least one ducted fan turbojet 100 according to the invention. The fastening of the ducted fan turbojet 100 under the wing 14 is made by means of a pylon.

In the description that follows, and by convention, the longitudinal axis of the ducted fan turbojet 100 is called X, axis which is parallel to the longitudinal axis of the aircraft 10 and positively oriented towards the front of the aircraft 10, the transversal axis, which is horizontal when the aircraft 10 is on the ground is called Y, and the vertical axis when the aircraft is on the ground is called Z, these three directions X, Y and Z being orthogonal to one another.

Figure 2:
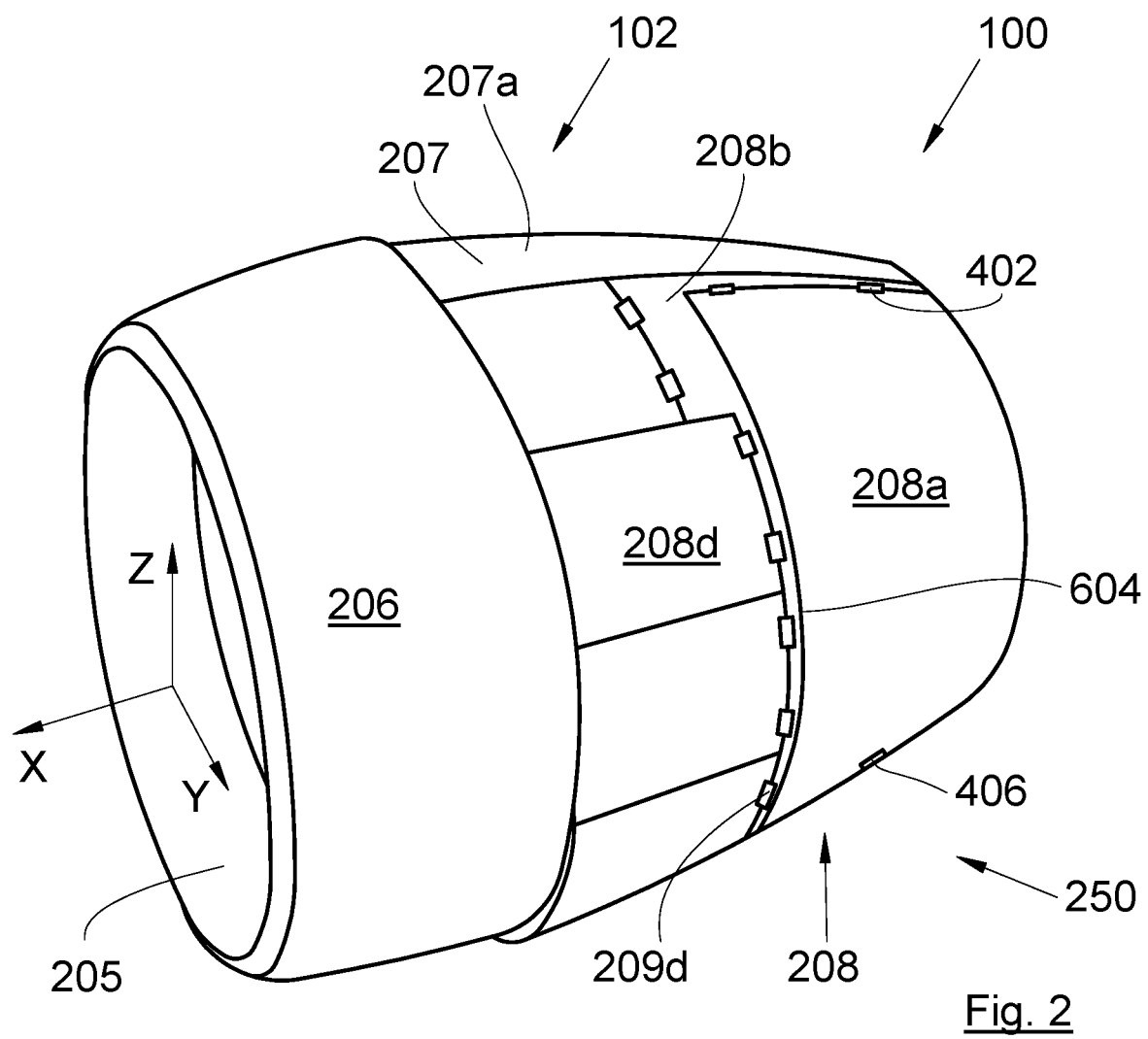
FIG. 2 is a perspective view of a ducted fan turbojet according to the invention when the thrust reverser system is not activated.
Figure 3:
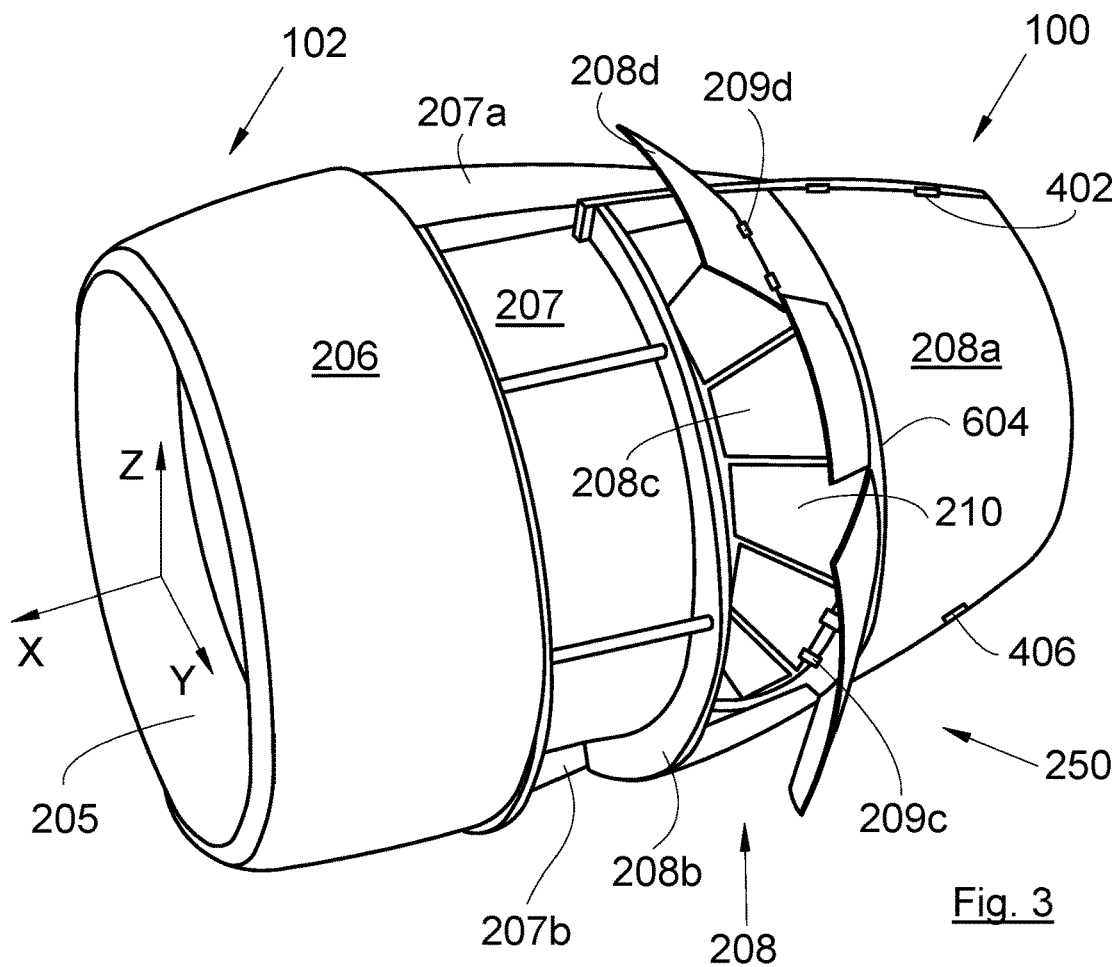
FIG. 3 is a perspective view of the ducted fan turbojet when the thrust reverser system is activated.

FIGS. 2 and 3 show the ducted fan turbojet 100.

The ducted fan turbojet 100 has a nacelle 102, an engine that is housed inside the nacelle 102 in the shape of a core and a fan casing 206 forward of the nacelle 102.

Like the nacelle of the prior art, the nacelle 102 has two internal fixed structures (IFS) and two outer structures (OS).

Each internal fixed structure is assembled hinged on the pylon 16 by means of at least one hinge and is mobile between a closed position in which the internal fixed structure is tightened around the engine and an open position in which the internal fixed structure is away from the engine. The axis of each hinge is globally parallel to the longitudinal axis X.

In the closed position, the two internal fixed structures are contiguous and globally form a cylinder that surrounds the engine and constitutes the inside wall of a bypass duct.

The turbojet 100 includes a thrust reverser system 250 that is retracted on FIG. 2 and deployed on FIG. 3.

The ducted fan turbojet 100 has, between the nacelle 102 and the engine, the bypass duct in which a bypass flow circulates that comes from the air intake 205 through a fan and which therefore flows along a flow direction that goes from the front to the rear of the aircraft 10.

The nacelle 102 has a fixed structure 207 that is assembled fastened to the fan casing 206.

The thrust reverser system 250 has a mobile assembly 208 that comprises a mobile structure 208a forming the walls of the jet pipe and a frame 208b. The frame 208b here is in the shape of a cylinder with perforated walls. The mobile structure 208a is fastened to the frame 208b.

There are two mobile structures 208a disposed on either side of a median plane of the ducted fan turbojet 100, each constituting an outer structure of the nacelle 102 as described above, and they globally form a cylinder that surrounds the internal fixed structures, and, in the closed position, the two mobile structures 208a constitute the outside wall of the bypass duct.

The mobile assembly 208 is assembled, by means of the frame 208b, mobile in translation along a direction of translation globally parallel to the longitudinal axis X, on the fixed structure 207 of the nacelle 102, and more particularly here on the 12 o'clock beam 207a and the 6 o'clock beam 207b of the fixed structure 207.

The translation of the frame 208b, and therefore of the mobile assembly 208, is provided by any appropriate slide systems such as, for example, slides between the fixed structure 207 and the frame 208b. In the same way, a first system of mechanical transmission of the thrust reverser system 250 is fastened to the fixed structure 207 so as to move the frame 208b. The first system of mechanical transmission comprises, for example, actuators such as jacks, motors, racks, etc. The first system of mechanical transmission is controlled by a control unit of the aircraft 10 and is not described in further detail, as it can have different forms within the reach of the person skilled in the art.

The mobile assembly 208 also includes thrust reverser doors 208c-d that are assembled hinged on the frame 208b and that comprise inner doors 208c and outer doors 208d.

The doors 208c-d are disposed forward with respect to the mobile structure 208a.

Each inner door 208c is assembled hinged on the frame 208b between a stowed position and a deployed position (FIG. 3) and vice versa. The passage from the stowed position to the deployed position is made by a rotation of the inner door 208c towards the interior of the turbojet 100.

Each inner door 208c is hinged by a rear edge at the frame 208b by hinges 209c fastened to the frame 208b, while the opposite free edge is positioned forward in the stowed position and across the bypass duct and towards the engine in the deployed position.

The outer doors 208d are disposed outside with respect to the inner doors 208c. Each outer door 208d is assembled facing an inner door 208c and the outer door 208d and the facing inner door 208c constitute a couple of doors. The thrust reverser system 250 thus includes a plurality of couples of doors 208c-d.

Each outer door 208d is assembled hinged on the frame 208b between a stowed position (FIG. 2) and a deployed position (FIG. 3) and vice versa. The passage from the stowed position to the deployed position is made by a rotation of the outer door 208d towards the exterior of the turbojet 100. When the inner doors 208c and the outer doors 208d are deployed, they globally form a continuity that allows the bypass flow to be diverted towards the exterior and forward of the nacelle 102.

Each outer door 208d is hinged by a rear edge at the frame 208b by hinges 209d fastened to the frame 208b while the opposite free edge is positioned forward in the stowed position and towards the exterior in the deployed position.

In the stowed position, the outer doors 208d are disposed between the mobile structure 208a and the fan casing 206, so as to constitute an outside wall of the nacelle 102, which is therefore in contact with the air flow that flows around the nacelle 102.

The passage of each door 208c-d from the stowed position to the deployed position, and vice versa is provided by a second mechanical transmission system of the thrust reverser system 250, comprising for example a motor, a jack, a rack system etc. The second mechanical transmission system is controlled by a control unit of the aircraft 10 and is not described in further detail, as it can have different forms within the reach of a person skilled in the art.

The mobile assembly 208, and therefore the frame 208b, is mobile between a forward position (FIG. 2) and a rear position (FIG. 3) and vice versa. In the forward position, the mobile assembly 208, and therefore the frame 208b, is positioned as far forward as possible such that the outer doors 208d, which are in the stowed position, are close to the fan casing 206. In the rear position, the mobile assembly 208, and therefore the frame 208b, is positioned as far back as possible, such that the outer doors 208d are away from the fan casing 206.

In the forward position, the outer doors 208d extend the fan casing 206 rearwards so as to define the outside surface of the bypass duct, and, in the same way, the mobile structure 208a extends the outer doors 208d rearwards so as to define the outside surface of the bypass duct.

The stowed position of the doors 208c-d can be adopted when the frame 208b is in the forward position or the rear position. The deployed position of the doors 208c-d can only be adopted when the frame 208b is in the rear position.

The passage from the forward position of the frame 208b to the rear position of the frame 208b and the deployed position of the doors 208c-d therefore consists, from the forward position of the frame 208b and therefore from the stowed positions of the doors 208c-d, of activating the first mechanical transmission system so as to move the frame 208b back by translation with respect to the fixed structure 207 so as to reach the rear position for the frame 208b and the stowed positions of the doors 208c-d, then of activating each second mechanical transmission system so as to move each door 208c-d from the stowed position to the deployed position.

The reverse movement makes it possible to return to the stowed and forward position.

In the rear position, the ducted fan turbojet 100 has a window 210 open between the bypass duct and the exterior of the nacelle 102 and which is delimited at the front by the fixed structure 207 and at the back by the mobile structure 208a. In the stowed position, the doors 208c-d obscure the window 210, and in the deployed position, the doors 208c-d do not obscure the window 210 and leave it free, that is to say, the air coming from the bypass flow passes through the window 210 so as to reach the exterior of the ducted fan turbojet 100.

When the doors 208c-d are in the deployed position, the bypass flow is diverted towards the exterior of the nacelle 102 and towards the front, making it possible to produce a counter-thrust.

The 12 o'clock beam 207a and the 6 o'clock beam 207b extend along a direction globally parallel to the longitudinal axis X.

The frame 208b is semicylindrical in shape and moves in translation between the 12 o'clock beam 207a and the 6 o'clock beam 207b. For this purpose, the frame 208b includes a high beam 404a that is positioned against the 12 o'clock beam 207a and which is parallel to it, and a low beam 404b that is positioned against the 6 o'clock beam 207b and which is parallel to it.

Figure 4:
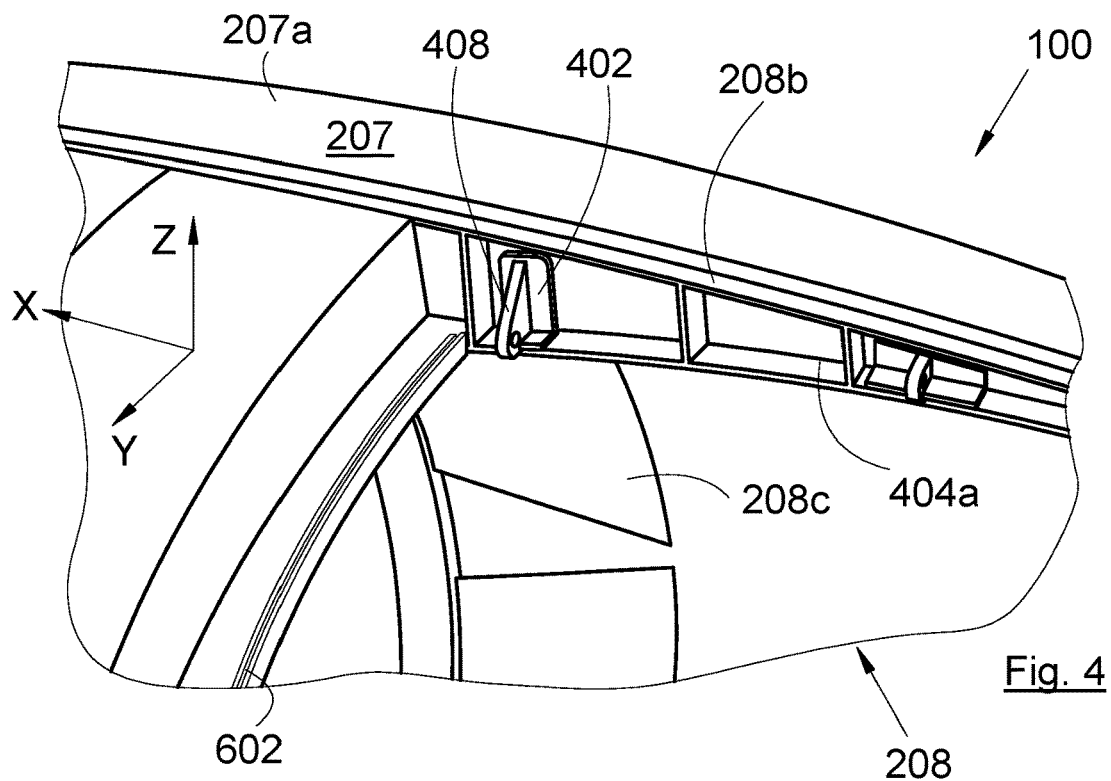
FIG. 4 is a perspective view of a detail of the ducted fan turbojet according to the invention at the 12 o'clock beam.
Figure 5:
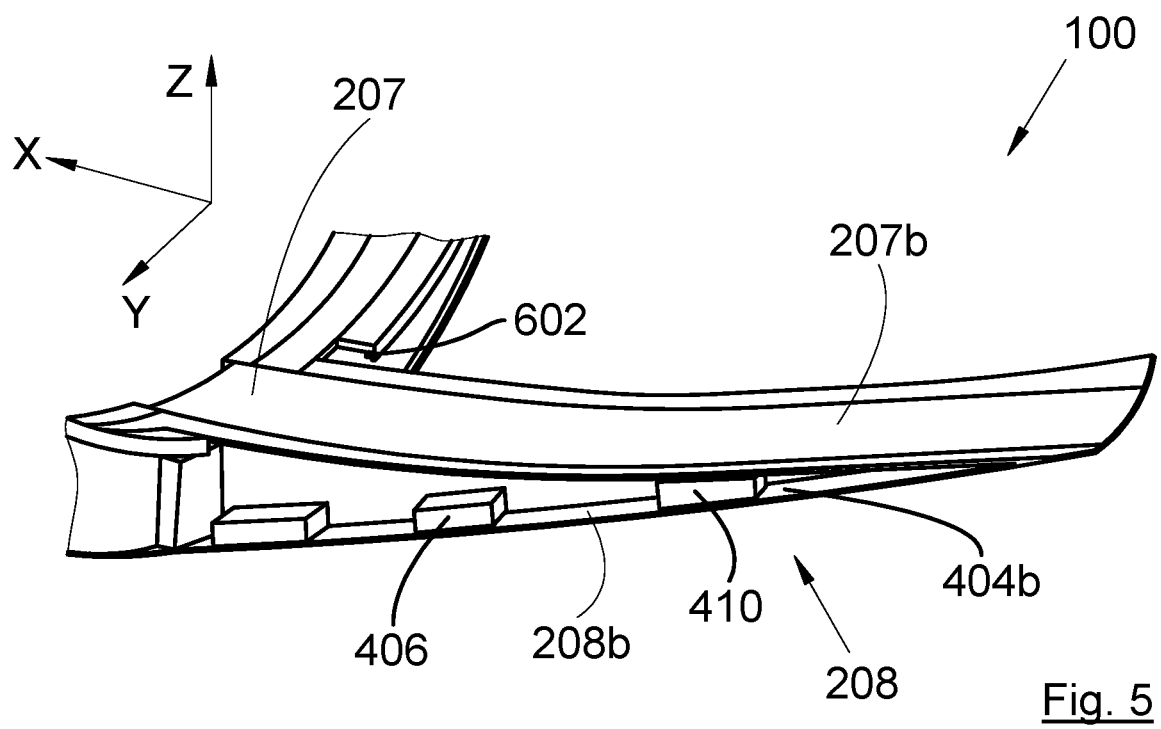
FIG. 5 is a perspective view of a detail of the ducted fan turbojet according to the invention at the 6 o'clock beam.
Figure 6:
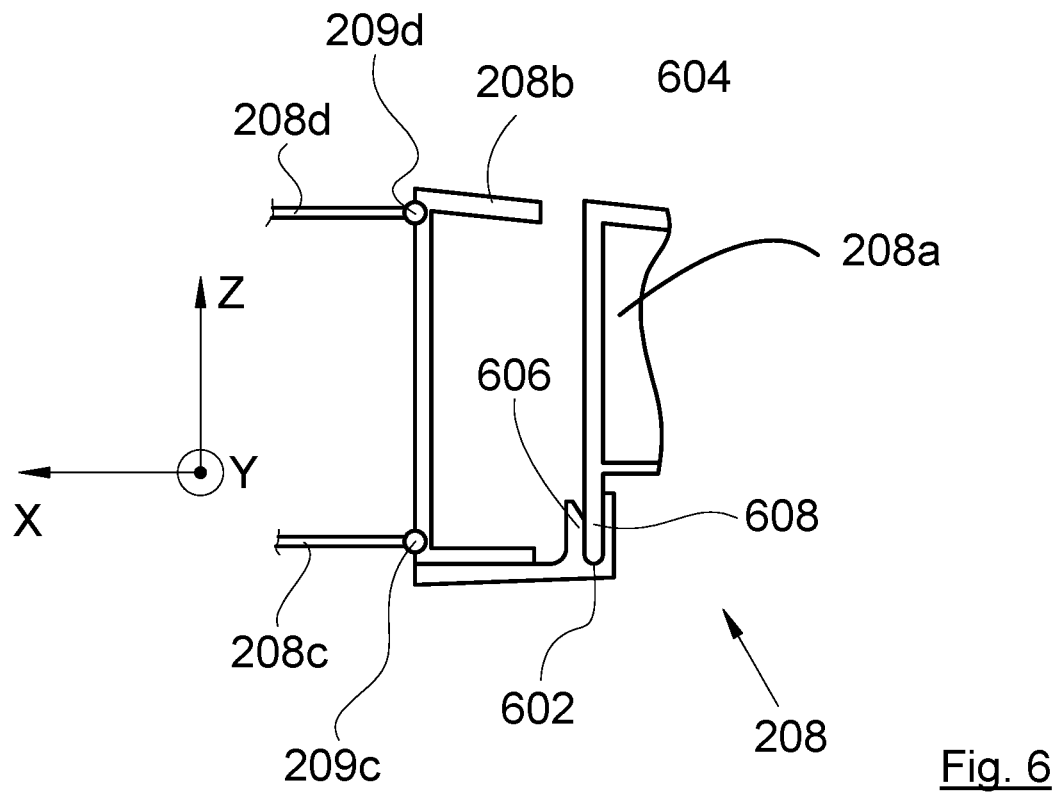
FIG. 6 is a section along a radial plane of a detail of the ducted fan turbojet according to the invention.
Figure 7:
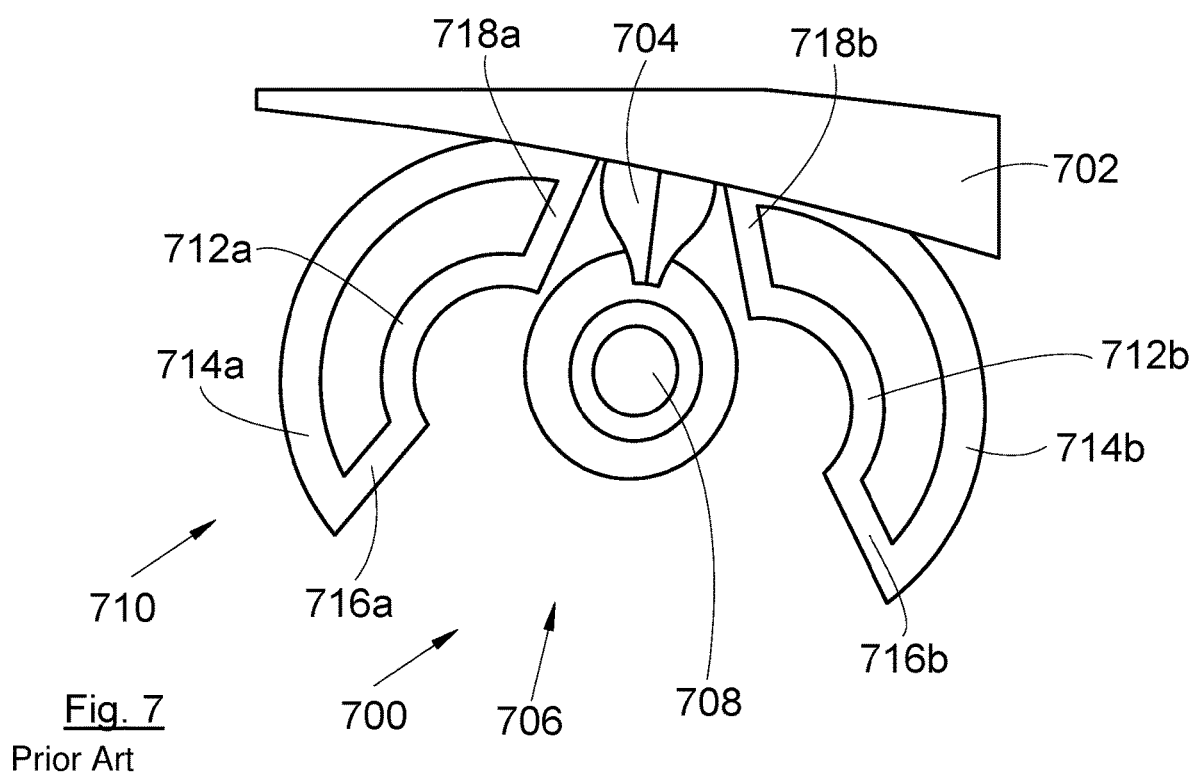
FIG. 7 is a view of the back of a propulsion system of the prior art.

FIGS. 4 and 5 show the particular arrangement of the mobile structure 208a on the frame 208b.

The mobile structure 208a is assembled hinged on the frame 208b by means of at least one hinge 402 whose axis of rotation is globally parallel to the longitudinal axis X. Each hinge 402 is fastened between the high beam 404a and a high part of the mobile structure 208a.

Each hinge 402 here is in the shape of a clevis integral with the mobile structure 208a and accommodating a drilled plate 408 integral with the frame 208b.

The mobile structure 208a thus moves at the same time as the frame 208b when the ducted fan turbojet 100 is operating, in particular in the thrust reversing phase, and it can open upwards so as to free the space necessary for the maintenance of the ducted fan turbojet 100.

So as to lock the mobile structure 208a in the closed position, the ducted fan turbojet 100 includes at least one lock 406 fastened to the low beam 404b or to a low part of the mobile structure 208a and that locks the low part of the mobile structure 208a on the low beam 404b.

So as to limit vibration of the mobile structure 208a in the closed position, stops 410 are fastened to the low beam 404b and, for each stop 410, a counter-stop is fastened to the low part of the mobile structure 208a, and in the closed position of the mobile structure 208a, the counter-stop presses against the associated stop 410.

FIG. 5 shows an embodiment detail of the invention.

The frame 208b has a groove 602 that is open to the exterior of the ducted fan turbojet 100 and that extends on a circular periphery 606 of the frame 208b. The circular periphery 606 is the part facing the forward edge 604 of the mobile structure 208a in the closed position, that is to say, the edge that is in the extension of the doors 208c-d.

The mobile structure 208a has, at its forward edge 604, a rib 608 that extends along the forward edge 604 and which, in the closed position, is positioned in the groove 602.

The interaction between the rib 608 and the groove 602 ensures, in the closed position, correct positioning of the mobile structure 208a with respect to the frame 208b.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A ducted fan turbojet including an engine, a nacelle surrounding the engine and a fan casing, where a bypass duct for a bypass flow is delimited between the nacelle and the engine and in which an air flow circulates along a flow direction, the nacelle comprising:
 a fixed structure fastened to the fan casing,
 a thrust reverser system having a frame, a mobile structure fastened to the frame, inner doors hinged by a rear edge at the frame and outer doors hinged by a rear edge at the frame, the inner doors and the outer doors being disposed forward with respect to the mobile structure,
 the frame being mobile in translation on the fixed structure along a direction of translation between a forward position in which the frame is positioned such that the outer doors are close to the fan casing and a rear position in which the frame is positioned such that the outer doors are away from the fan casing so as to define a window between the fixed structure and the mobile structure, the window being open between the bypass duct and an exterior of the nacelle,
 each of the inner doors and each of the outer doors being mobile between a stowed position in which the respective door obscures the window and a deployed position in which the respective door does not obscure the window, the mobile structure being assembled hinged on the frame by means of at least one hinge whose axis of rotation is globally parallel to a longitudinal axis of the ducted fan turbojet, the fixed structure including a 12 o'clock beam, wherein the frame includes a high beam that is positioned against the 12 o'clock beam, and each at least one hinge of the mobile structure being fastened between the high beam and a high part of the mobile structure.

2. The ducted fan turbojet according to claim 1, wherein the fixed structure includes a 6 o'clock beam, wherein the frame includes a low beam that is positioned against the 6 o'clock beam, and wherein the frame includes at least one lock that locks a low part of the mobile structure on the low beam in a closed position.

3. The ducted fan turbojet according to claim 2, wherein the low beam has stops, and wherein for each stop, the low part of the mobile structure includes a counter-stop that presses against said stop in the closed position.

4. The ducted fan turbojet according to claim 1, wherein the frame has a groove open to the exterior and extending on a circular periphery of the frame that faces a forward edge of the mobile structure, wherein the forward edge has a rib that extends along said forward edge, and wherein, in a closed position, the rib is positioned in the groove.

5. An aircraft including at least one ducted fan turbojet according to claim 1.

6. A ducted fan turbojet comprising:

an engine, a nacelle surrounding the engine, a fan casing at a forward end of the nacelle, and a bypass duct for a bypass flow delimited between the nacelle and the engine and in which an air flow circulates along a flow direction, the nacelle comprising:

a fixed structure fastened to the fan casing, a thrust reverser system having a frame, a mobile structure fastened to the frame, inner doors hinged by a rear edge at the frame and outer doors hinged by a rear edge at the frame, the inner doors and the outer doors being disposed forward with respect to the mobile structure, the frame being mobile in translation on the fixed structure along a direction of translation between a forward position wherein the frame is positioned such that forward edges of the outer doors are positioned close to the fan casing and a rear position wherein the frame is positioned such that the forward edges of the outer doors are spaced away from the fan casing so as to define a window between the fixed structure and the mobile structure, the window being open between the bypass duct and an exterior of the nacelle, each of the inner doors and each of the outer doors being mobile between a stowed position in which the respective door obscures the window and a deployed position in which the respective door does not obscure the window, the mobile structure being assembled hinged on the frame via at least one hinge having an axis of rotation globally parallel to a longitudinal axis of the ducted fan turbojet, the fixed structure including a 12 o'clock beam, wherein the frame includes a high beam positioned against the 12 o'clock beam, and each at least one hinge of the mobile structure being fastened between the high beam and a high part of the mobile structure.

7. The ducted fan turbojet according to claim 6, wherein the fixed structure includes a 6 o'clock beam, wherein the frame includes a low beam that is positioned against the 6 o'clock beam, and wherein the frame includes at least one lock that locks a low part of the mobile structure on the low beam in a closed position.

8. The ducted fan turbojet according to claim 7, wherein the low beam has stops, and wherein for each stop, the low part of the mobile structure includes a counter-stop that presses against said stop in the closed position.

9. The ducted fan turbojet according to claim 6, wherein the frame has a groove open to the exterior and extending on a circular periphery of the frame that faces a forward edge of the mobile structure, wherein the forward edge of the mobile structure has a rib that extends along said forward edge of the mobile structure, and wherein, in a closed position, the rib is positioned in the groove.

10. An aircraft including at least one ducted fan turbojet according to claim 6.

* * * * *